(12) United States Patent
Rettich et al.

(10) Patent No.: US 9,061,354 B2
(45) Date of Patent: Jun. 23, 2015

(54) METHOD FOR MACHINING BY LATHING, AND LATHE

(75) Inventors: Thorsten Rettich, Konigsfeld (DE); Reiner Jörg, Schramberg (DE)

(73) Assignee: J.G. Weisser Söhne GmbH & Co. KG, St. Georgen (DE)

( * ) Notice: Subject to any disclaimer, the term of this patent is extended or adjusted under 35 U.S.C. 154(b) by 662 days.

(21) Appl. No.: 13/390,846

(22) PCT Filed: Aug. 11, 2010

(86) PCT No.: PCT/EP2010/004902
§ 371 (c)(1),
(2), (4) Date: Feb. 16, 2012

(87) PCT Pub. No.: WO2011/023293
PCT Pub. Date: Mar. 3, 2011

(65) Prior Publication Data
US 2012/0144966 A1    Jun. 14, 2012

(30) Foreign Application Priority Data
Aug. 29, 2009  (DE) .................. 10 2009 039 346

(51) Int. Cl.
*B23C 3/18*    (2006.01)
*B23B 5/36*    (2006.01)
*B23B 5/18*    (2006.01)

(52) U.S. Cl.
CPC .. *B23B 5/36* (2013.01); *Y10T 82/13* (2015.01); *Y10T 82/10* (2015.01); *Y10T 409/30756* (2015.01); *Y10T 82/2508* (2015.01); *Y10T 409/305656* (2015.01); *B23B 5/18* (2013.01); *B23B 2215/81* (2013.01); *B23B 2265/12* (2013.01)

(58) Field of Classification Search
CPC ............ B23C 3/18; B23C 3/16; B23C 3/002; B23C 3/04; B23B 1/00; B23B 5/08; B23B 5/18; B23B 5/36; B23B 3/26
USPC ......... 82/1.11, 11, 18, 12, 129; 409/165, 166, 409/167, 168, 198, 199, 200, 224
See application file for complete search history.

(56) References Cited

U.S. PATENT DOCUMENTS 1,025,728 A * 5/1912 Wheeling et al. ............... 82/106
1,080,797 A * 12/1913 Witteman ..................... 82/106
1,098,654 A * 6/1914 Wilder ........................... 82/106

(Continued)

FOREIGN PATENT DOCUMENTS

DE          625156       2/1936
DE         19511420     10/1995

(Continued)

*Primary Examiner* — Daniel Howell
*Assistant Examiner* — Nicole N Ramos
(74) *Attorney, Agent, or Firm* — Volpe and Koenig, P.C.

(57) ABSTRACT

A lathe (1) in which the work piece (16) to be lathed with a tool (18) is clamped with the longitudinal axis of the work piece parallel to the rotational axis (29) of the rotating clamping device (15) such that the rotational axis (29) does not intersect the work piece (16), and between two machining steps of the machining process by lathing, a position of the work piece (16) in the clamping device (15) is changed such that surface areas (30, 36) not previously machined are moved into the working area of the tool (18).

29 Claims, 14 Drawing Sheets

(56) References Cited

U.S. PATENT DOCUMENTS

| | | | | |
|---|---|---|---|---|
| 1,383,634 | A | * | 7/1921 | Johnson .................. 82/106 |
| 2,291,035 | A | | 7/1942 | Groene |
| 2,599,931 | A | * | 6/1952 | Mosca ..................... 82/106 |
| 3,593,603 | A | | 7/1971 | Gellert |
| 4,599,769 | A | * | 7/1986 | Latzko et al. ............. 29/26 A |
| 5,275,072 | A | * | 1/1994 | Schmid et al. ............ 82/164 |
| 5,309,800 | A | | 5/1994 | Yuhara |
| 5,396,821 | A | | 3/1995 | Okumura et al. |
| 5,471,900 | A | * | 12/1995 | Corwin et al. ............. 82/1.11 |
| 5,622,092 | A | * | 4/1997 | Gleason .................... 82/106 |
| 5,727,296 | A | * | 3/1998 | Kobler ..................... 29/27 C |
| 5,733,080 | A | * | 3/1998 | David et al. .............. 409/132 |
| 5,765,270 | A | * | 6/1998 | Schrod et al. ............. 29/27 R |
| 6,068,541 | A | * | 5/2000 | Dwyer ..................... 451/28 |
| 6,185,818 | B1 | * | 2/2001 | Ito et al. .................. 29/889.7 |
| 6,711,804 | B2 | * | 3/2004 | Eicher ..................... 29/563 |
| 6,973,861 | B2 | * | 12/2005 | Shimomura ............. 82/106 |
| 7,261,500 | B2 | * | 8/2007 | Killer et al. ............. 409/132 |
| 8,491,357 | B2 | * | 7/2013 | Hessbrueggen .......... 451/399 |

FOREIGN PATENT DOCUMENTS

| | | | |
|---|---|---|---|
| JP | 58223502 | A * | 12/1983 |
| JP | 01051201 | A * | 2/1989 |
| WO | 0115845 | | 3/2001 |

* cited by examiner

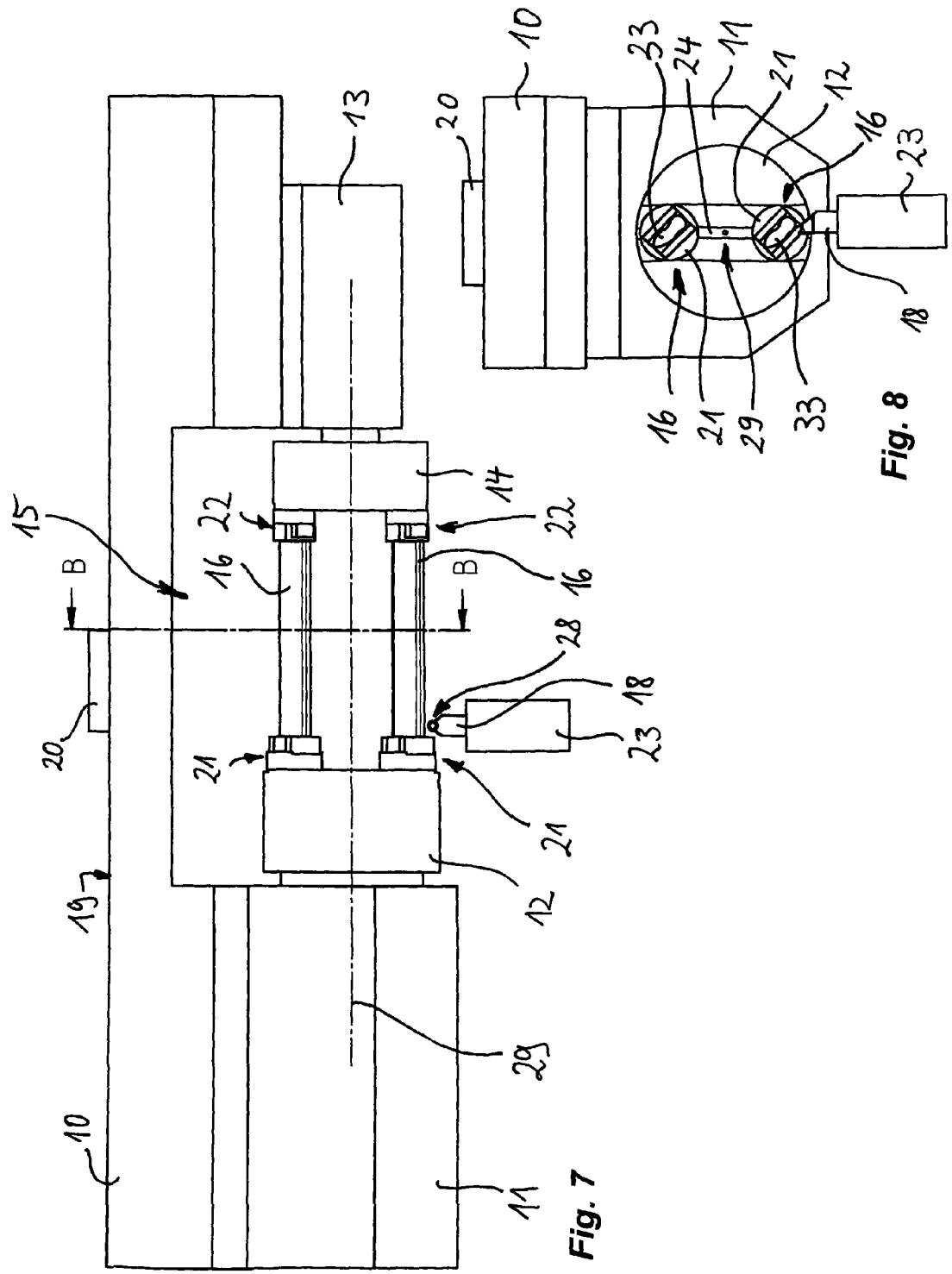

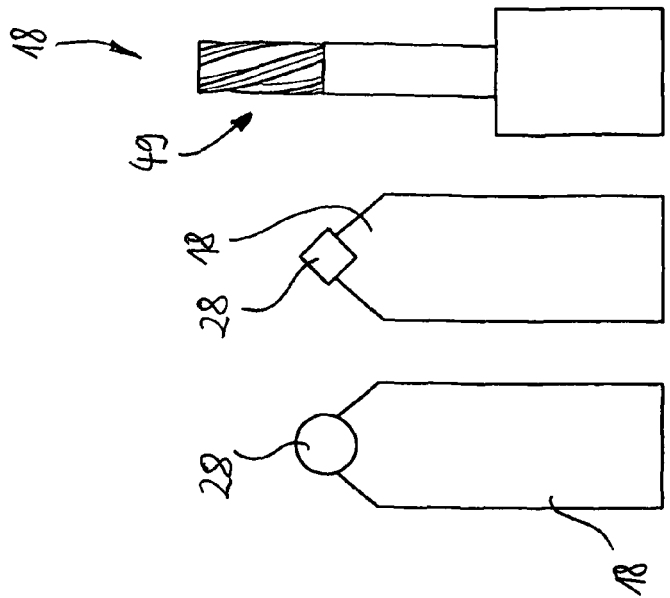
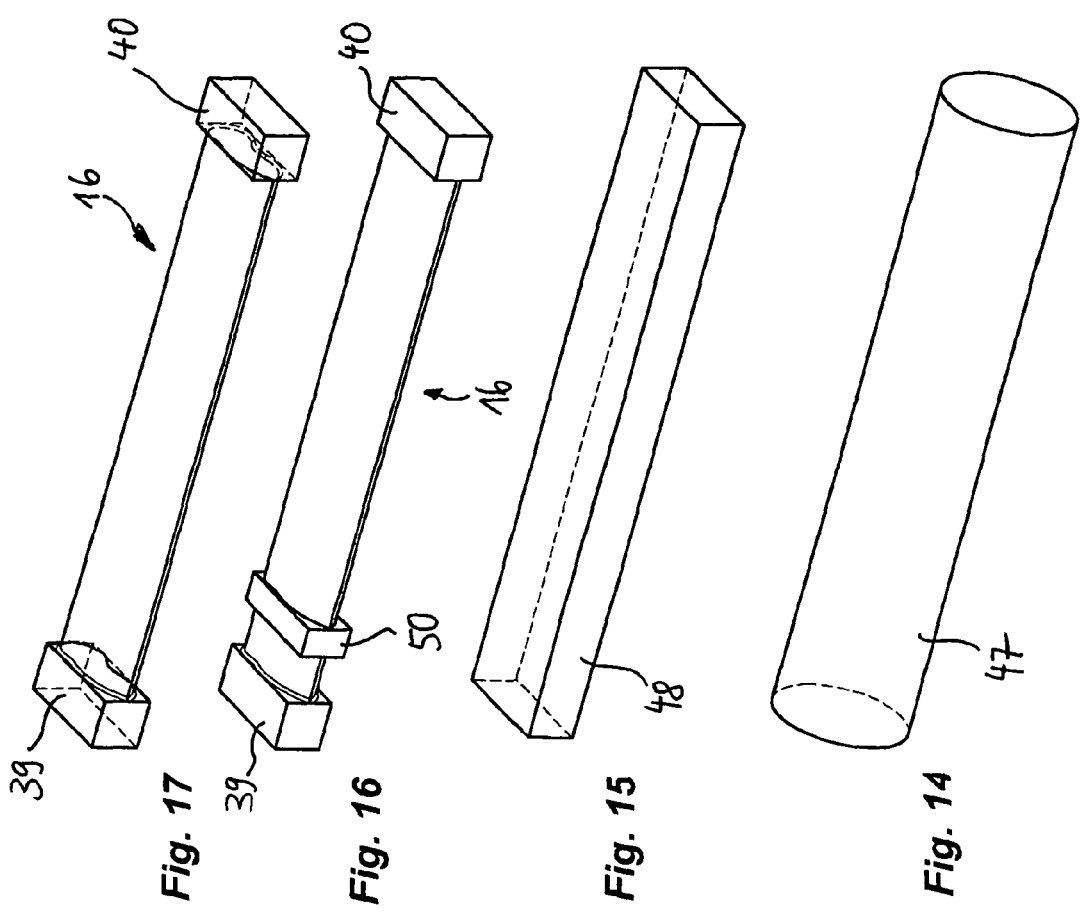

METHOD FOR MACHINING BY LATHING, AND LATHE

BACKGROUND

The invention relates to a method for machining by lathing an elongate workpiece having a longitudinal axis, which workpiece is chucked in a fixture and is rotated at a machining speed about an axis of rotation, a turning tool which performs the lathing being fed transversely, in particular radially, with respect to the axis of rotation and/or tangentially, and the cutting speed of lathing resulting from the rotation of the workpiece in relation to the turning tool.

The invention relates, further, to a lathe with a fixture driven by a rotary spindle and with a tool carrier capable of being fed transversely, in particular radially, to the axis of rotation of the rotary spindle and/or tangentially and having a turning tool.

Such methods and devices for the lathing of workpieces are known in the most diverse possible forms, the workpiece being rotatable about a central axis, the axis of rotation, and the tool being capable of being fed radially or else tangentially.

For many workpieces, however, lathing of this kind is unsuitable, for example for turbine blades which have hitherto often been chucked in relation to an axis running approximately through them in the longitudinal direction and also have been moved in relation to this axis, but on which a milling tool engages.

Such a method for the machining of turbine blades requires a large number of feed axes for the milling tool, of rotary drives and of mutually adapted drives and controls. In this case, the cutting speed arises from the very high rotational speed of the tool of 8000-12000 rpm, as compared with turning.

SUMMARY

The object, therefore, is to provide a method of the type initially mentioned, in which a cross-sectional profile deviating from a circular cross section can be produced by means of fewer drives and adjustment axes.

To achieve this object, in a method of the type initially mentioned, there is provision whereby the workpiece is chucked with its longitudinal axis parallel to the axis of rotation, but eccentrically and at a radial distance from the axis of rotation, in the fixture, and the turning tool is fed radially from outside transversely with respect to the axis of rotation, the workpiece orbiting about the axis of rotation on an imaginary cylinder, and whereby the orbiting speed corresponds to the rotational speed of the workpiece, and, during an orbiting movement about the central axis of rotation, the workpiece executes a revolution, and always the same outer face of the workpiece points radially outward during machining by cutting.

The workpiece can thus orbit about the axis of rotation on an imaginary cylinder, the orbiting speed corresponding to the rotational speed of the workpiece, that is to say, during an orbiting movement of the workpiece about the central axis of rotation or axis of rotation, the latter itself also executes one revolution, so that always the same outer face also points radially outward and can then be machined by cutting by the tool. Since the longitudinal axis of that region of the workpiece which is to be machined in each case does not coincide with the axis of rotation, and therefore, the machining method leads to an interrupted turning process because of eccentric chucking, the entire circumference of the workpiece is not lathed at the machining point, but instead only the outer face of the workpiece revolving along the cylindrical circular path.

The invention can therefore manage with fewer feed axes, as compared with the known methods. It is in this case also advantageous that the relative speed between tool and workpiece, required for cutting machining, does not, as in the known methods, arise from the speed of intrinsic rotation of the workpiece about its longitudinal axis, but instead it results from the rotational speed of the workpiece about the axis of rotation and the radial distance of the workpiece from the axis of rotation. It is thus possible even to make contours which, when the workpiece is chucked in a fixture of the known type, would result in a situation where the region to be machined in the workpiece endeavors to overtake the tool on account of the intrinsic rotation of the workpiece about the center of rotation in the case of a contour deviating from the circular shape, and this will lead to the destruction of the workpiece and/or tool. A much larger number of contours are therefore accessible to lathing.

In a refinement of the invention, there may be provision whereby, during a revolution of the workpiece, always the same outer face or the same surface region points radially outward. Workpieces can therefore be manufactured in a simple way which have, in the region of the outer face, a curvature with relatively large radius of curvature and, in the surface regions contiguous to this outer face, a curvature with a comparatively small radius of curvature, for example rounded edges or transitional regions. As a result of eccentric chucking at a radial distance from the axis of rotation, the tool can simply be led radially into the outer face for machining and led out of it, and the situation can be avoided where the cutting speed undershoots/overshoots a critical value.

Concave and/or convex outer contours of the surface of the workpiece which deviate from a segment of the surface area of a cylinder can be manufactured if, during a revolution of the workpiece, the turning tool is moved to different radial distances from the axis of rotation. In particular, the radial position of the turning tool with respect to the axis of rotation during a chip removal is thus changed in such a way as to give rise on the workpiece to a surface contour which deviates from the configuration of a segment of the surface area of a cylinder, that is to say which does not describe a segment of the surface area of a cylinder.

For this purpose, there may be provision whereby the feed movement of the turning tool is executed synchronously with the rotation of the workpiece. It is advantageous in this case that the desired manufacturing size can be generated by means of a plurality of machining operations which succeed one another during the revolutions of the fixture. This is equivalent to an interrupted cut, since the machining of the segment of the surface area of a cylinder takes place, in the case of one workpiece or two workpieces, only in a specific region during a revolution.

To manufacture workpieces having a longitudinal direction, there may be provision whereby the turning tool and the workpiece, during lathing, are additionally moved parallel to the axis of rotation in relation to one another. In this case, the turning tool or the workpiece may remain fixed in space together with the fixture or both the turning tool and the workpiece together with the fixture may be moved in relation to one another simultaneously.

In order to manufacture more complex profiles or contours which are described, for example, by at least two surfaces which meet at an edge or a rounding, there may be provision whereby, after the lathing of the radially outward-pointing surface regions, the position of the workpiece in the fixture is varied in such a way that hitherto radially inward-pointing surface regions point outward, and whereby the then outwardly-pointing surface regions are lathed. This variation in position may take place, for example, by displacement and/or rotation and/or rechucking. In particular, airfoil or turbine blade profiles can thus be manufactured, in that, first, one side face, that is to say the front side or top side, is machined and, in a subsequent operation, the other side face, that is to say the rear side or underside, is machined. A workpiece with a side face having a concave profile and with a side face having a convex profile can thus be manufactured in one chucking.

Alternatively or additionally, there may be provision whereby, to vary its position, the workpiece is moved in the fixture along a path lying in a radial plane, preferably along a path running through the axis of rotation, and/or onto the side lying opposite with respect to the axis of rotation. The workpiece is thus moved into a position on the fixture in which the surface originally pointing inward during the first machining pass and therefore not accessible to turning tools points radially outward and is therefore accessible to turning tools engaging radially from outside and is thus brought into the working range of the latter.

There may also be provision whereby, to vary its position, the workpiece is moved between a position spaced apart radially from the axis of rotation and a position which is central with respect to the axis of rotation. In this central position in which the axis of rotation runs through the workpiece, for example, intermediate machining steps can be carried out for complex profiles.

There may also be provision whereby, to vary its position, the workpiece is rotated in the fixture through an angle of rotation, in particular through 180°, about the longitudinal axis.

Especially short manufacturing times can be achieved if at least two workpieces are chucked on the rotating fixture and if the at least two workpieces are lathed in a common operation.

To manufacture the root regions or fastening regions of turbine blades and/or of cross-sectional thickenings along the longitudinal axis, there may be provision whereby the turning tool, during lathing, is pivoted with its feed direction in a radial plane and/or in a plane including the axis of rotation.

For a simultaneous machining of a plurality of workpieces, there may be provision whereby at least two turning tools are used, which engage on the workpiece during lathing.

The advantages of the invention are especially useful when at least one nonround workpiece, in particular a workpiece having a cross section which is flat transversely to its longitudinal axis, is manufactured. Examples of this are turbine blades or airfoil profiles.

For manufacture, a blank with a free shape, in particular with a rectangular, round or elliptic initial cross section, can be lathed transversely to its longitudinal axis.

In order to achieve an approximation to the final shape cost-effectively and in a short time, there may be provision whereby, for lathing, first roughing and then smoothing are carried out. In this context, roughing typically designates a manufacturing operation with a large chip removal, while smoothing is understood to mean fine machining with a small chip removal. Roughing and smoothing may be carried out in one chucking or on separate machines.

For this purpose, it may be necessary, during roughing, for a change in the direction of rotation of the fixture to be carried out.

There may be provision whereby, during roughing, the radial distance of the tool from the axis of rotation of the fixture remains unchanged over a revolution. An even better approximation to a final shape of nonround cross section can be achieved if, for the roughing operation, the tool is also moved radially during chip removal. For example, in this case, the distance can initially be kept constant, and a radial feed can take place with progressive machining.

There may therefore be provision whereby, during roughing, the workpiece is given a shape which lies near to the finished contour. In this case, approximation can be selected as a function of the curvature of the workpiece in the final shape and/or of the size of the workpiece. For example, the blank can be manufactured to a deviation of ½ mm or even ¹⁄₁₀ mm from the final shape by roughing.

By the workpiece being offset radially out of the axis of rotation, sufficient cutting speeds can be achieved even when the rotation of the workpiece is executed at at least 5 rev/min, preferably at least 10 rev/min.

In a refinement of the invention, there may be provision whereby, in one chucking, in the case of a first workpiece, on the one hand, and a second workpiece, on the other hand, different surface regions, in particular with differently curved contours running transversely to the respective longitudinal axis, are machined. Thus, for example, two tools may be provided, of which one is set up for machining a concave contour and the other for machining a convex contour, or the tool may be guided during a revolution of the fixture, without mechanically especially complicated, especially rapid return movements, such that, in one half of each revolution, a radially further outward contour is machined by the tool on the one workpiece and, in the other half of the revolution, a radially further inward contour is machined by the tool on the other workpiece.

To achieve the object, in a lathe of the type initially mentioned, there is provision whereby the fixture has a workpiece receptacle arranged eccentrically at a radial distance from the axis of rotation of the rotary spindle, and whereby a synchronizing device is provided, which synchronizes the feed movement of the tool carrier with the rotation of the rotary spindle. It is advantageous in this case that workpieces with nonround cross sections, that is to say profiles or contours, longitudinally to their longitudinal axis oriented parallel to the axis of rotation in the chucking position, can be manufactured, while, in contrast to the known devices and methods, the minimum cutting speed required for machining by cutting does not constitute any or essentially any limitation to the radii of curvature which can be made to the profile or to the contour. On the contrary, by virtue of the invention, a cutting speed higher that zero is always obtained.

For exact guidance of the workpiece during machining by cutting and to avoid centrifugally-induced or unbalance-induced vibrations of the workpiece, there may be provision whereby the fixture has a tailstock center sleeve rotatable about the axis of rotation of the rotary spindle and having a counterholding receptacle for that end of the workpiece which faces away from the rotary spindle.

Additionally or alternatively, there may be provision whereby the fixture has unbalance compensation for the chucked workpiece.

In a preferred embodiment, there may be provision whereby the unbalance compensation and the workpiece receptacle are arranged so as to be movable synchronously. Preferably, the unbalance compensation and workpiece receptacle are movable radially. For this purpose, mechanical and/or electronic synchronizing means are formed on the fixture and/or on the lathe. It is in this case advantageous that the unbalance compensation does not have to be readjusted when the position of the workpiece in the fixture is varied for the purpose of machining further surfaces.

It is especially beneficial if the unbalance compensation is formed by a further chucked workpiece. There may be provision whereby the workpieces are arranged so as to be variable in positions synchronously.

For this purpose, there may be provision whereby the fixture has an arrangement of at least two workpiece receptacles which is rotationally symmetrical with respect to the axis of rotation of the rotary spindle.

A change in the position of the workpieces with respect to the fixture, without these being released and the workpiece removed, can be carried out if the workpiece receptacle and/or the counterholding receptacle are/is arranged so as to be movable rotatably about an axis oriented parallel to the axis of rotation of the rotary spindle. Alternatively, or additionally, there may be provision whereby the workpiece receptacle and/or the counterholding receptacle are/is arranged so as to be movable transversely to the axis of rotation. For this purpose, for example, guide means may be formed for a movement travel which intersects the axis of rotation and/or a movement travel which leads onto the side lying opposite with respect to the axis of rotation or to an axial plane.

For a further improvement in the running accuracy of the workpiece arranged in the fixture, there may be provision whereby the tailstock center sleeve can be driven by a rotary drive.

It is especially beneficial in this case if a further synchronizing device is provided, by which the rotation of the rotary spindle can be synchronized with the rotation of the tailstock center sleeve. For example, the synchronizing device may have electronic or mechanical synchronizing means.

For a multistep manufacturing method, a machining unit for rough machining may additionally be provided.

Complex profiles, for example with cross-sectional thickenings along the longitudinal axis of the workpiece, can be manufactured if the tool carrier is arranged pivotably about an axis oriented askew to the axis of rotation of the rotary spindle, in particular about an axis lying in a radial plane. In this context, two mathematical axes are skew to one another if they neither run parallel to one another nor intersect one another.

For the manufacture of elongate workpieces, there may be provision whereby the tool carrier and the workpiece receptacle are additionally arranged so as to be movable with respect to one another parallel to the axis of rotation of the rotary spindle. In this case, the tool carrier or the workpiece receptacle may be arranged so as to be fixed in space or both may be set up for simultaneous contradirectional movement.

The invention, then, is described in more detail by means of an exemplary embodiment, but is not restricted to this exemplary embodiment. Further exemplary embodiments arise as a result of the combination of individual and/or several features of the claims and/or with individual and/or several features of the exemplary embodiments.

BRIEF DESCRIPTION OF THE DRAWINGS

In the drawing, in partially diagrammatic illustration,

FIG. 7 shows a view of the headstock, tailstock and tool carrier according to FIG. 3 from the front, FIG. 8 shows a sectional view of FIG. 7 along B-B, FIG. 14 shows a blank of circular cross section, FIG. 15 shows a blank of rectangular cross section, FIG. 16 shows a turbine blade with a cross-sectional thickening, FIG. 17 shows a further turbine blade, FIG. 18 to FIG. 20 show tools for use in the lathe according to FIG. 1.

DETAILED DESCRIPTION OF THE PREFERRED EMBODIMENTS

Figure 1:
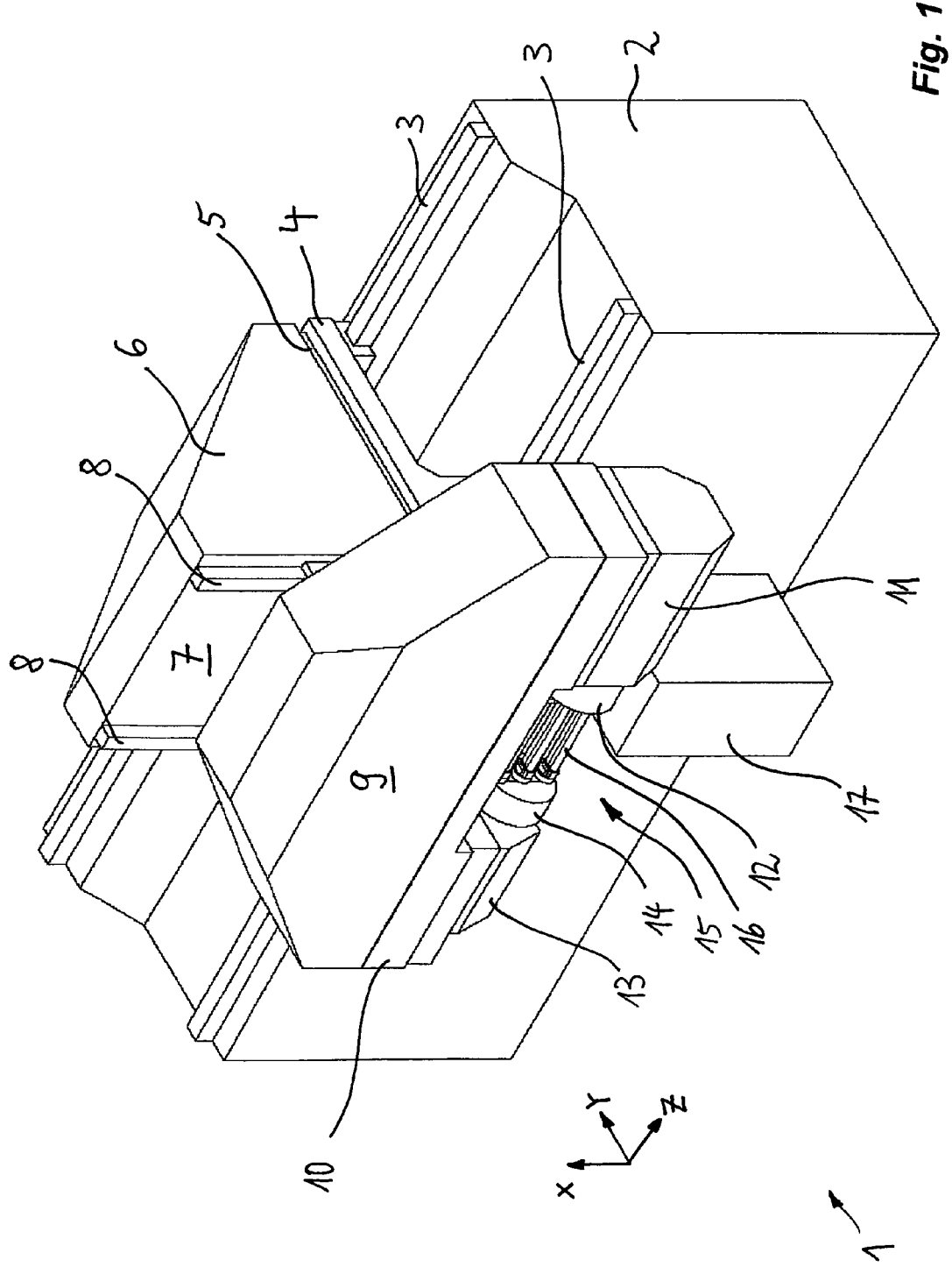
FIG. 1 shows an overall view of a lathe according to the invention in perspective from above.
Figure 2:
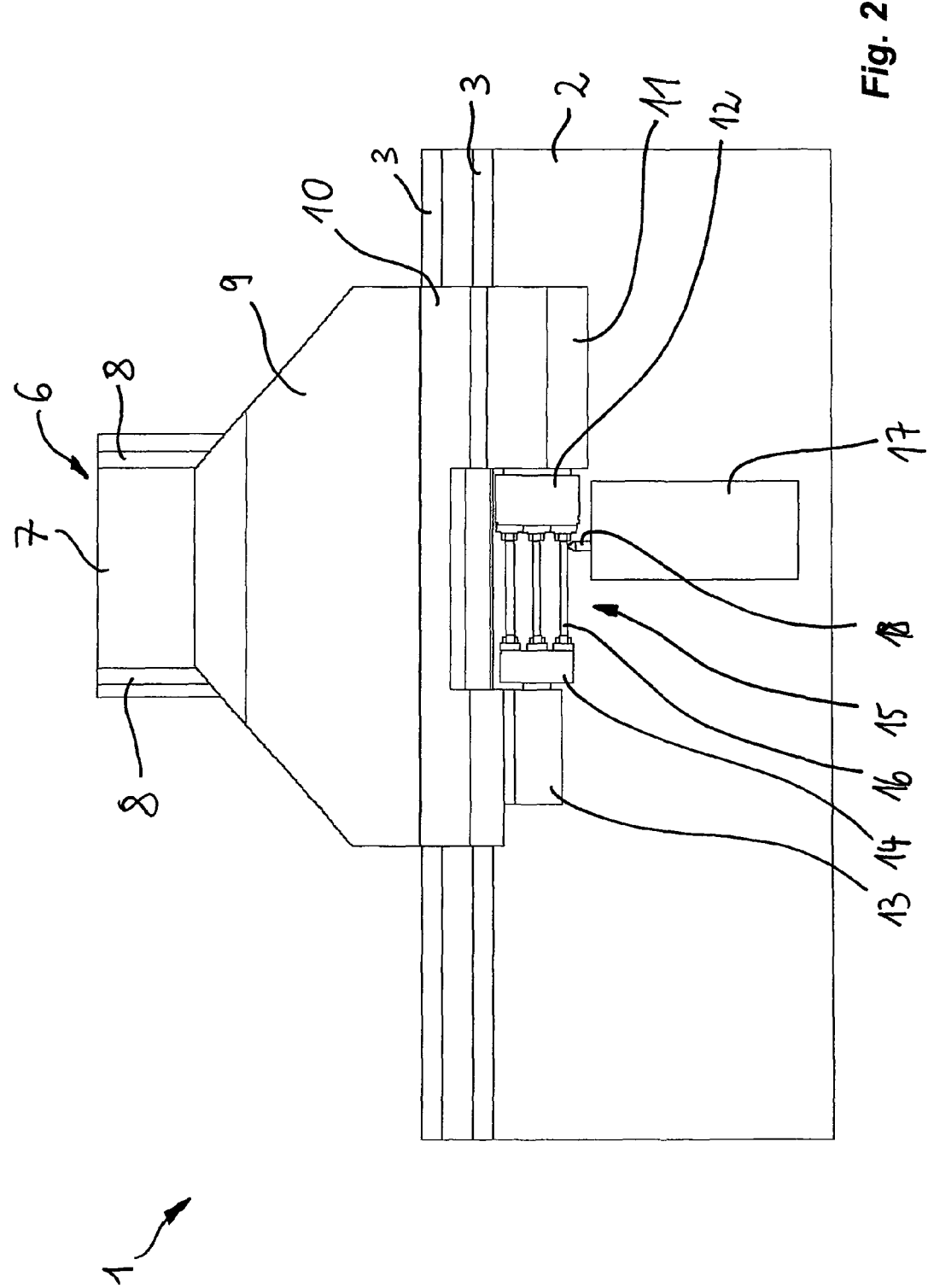
FIG. 2 shows the lathe according to FIG. 1 from the front.

FIG. 1 shows a lathe, designated as a whole by 1, in a perspective view from above. FIG. 2 shows the lathe 1 in a view from the front.

The lathe 1 has a machine bed 2, on which two horizontal linear guides 3 running parallel are arranged. A slide 4 is movable on the linear guides 3 in the Z-direction, that is to say in the drawing plane in FIG. 2. The drive means required for this purpose are not illustrated in any more detail.

Two further linear guides 5 likewise running parallel and oriented horizontally are arranged on the slide 4. Only one of the linear guides 5 can be seen in FIG. 1. The linear guides 5 define a movement travel which is oriented perpendicularly to the movement travel which is defined by the linear guides 3.

A further slide 6 is arranged movably on the linear guides 5 and can therefore be moved in the Y-direction along the linear guides 5 by drive means not illustrated in any more detail.

A further pair of linear guides 8 which run parallel and vertical is arranged on the front side 7 of the slide 6.

A vertical slide 9 is guided on these linear guides 8 and can thus be moved in the X-direction, that is to say vertically, the required drive means likewise not being illustrated in any more detail. The linear guides 3, 5 and/or 8 may comprise rails.

A cross member or a build-on slide 10 is suspended on the vertical slide 9 pivotably about a vertical pivot axis.

A headstock 11 with the clamping chuck 12 of a rotary spindle, not illustrated in any more detail, and a tailstock 13 with a tailstock center sleeve 14 are formed on the built-on slide 10. A drive, not evident in any more detail, is provided, by means of which the rotary spindle together with the clamping chuck 12 can be rotated about an axis of rotation.

A fixture 15 which constitutes a chucking point for a workpiece 16 is thus formed between the clamping chuck 12 and tailstock center sleeve 14. The chucked workpiece 16 can then be rotated by means of the drive of the clamping chuck 12 about the axis of rotation of the spindle for lathing.

Arranged fixedly on the machine bed 2 is a tool feed device 17 which provides a tool 18 which engages on the workpiece 16 during lathing.

The tool feed device 17 is thus arranged fixedly in space in the lathe 1, whereas the fixture 15 with the built-on slide 10 is arranged so as to be movable in the X-, Y- and Z-direction, as desired, and so as to be pivotable about said pivot axis for the suspension of the built-on slide 10.

In further exemplary embodiments, the built-on slide 10 is not suspended, but is set up, and/or there is provision whereby the tool feed device 17 is arranged so as to be movable in one direction of space or a plurality of directions of space and/or the built-on slide 10 is arranged so as to be fixed in space.

Figure 3:
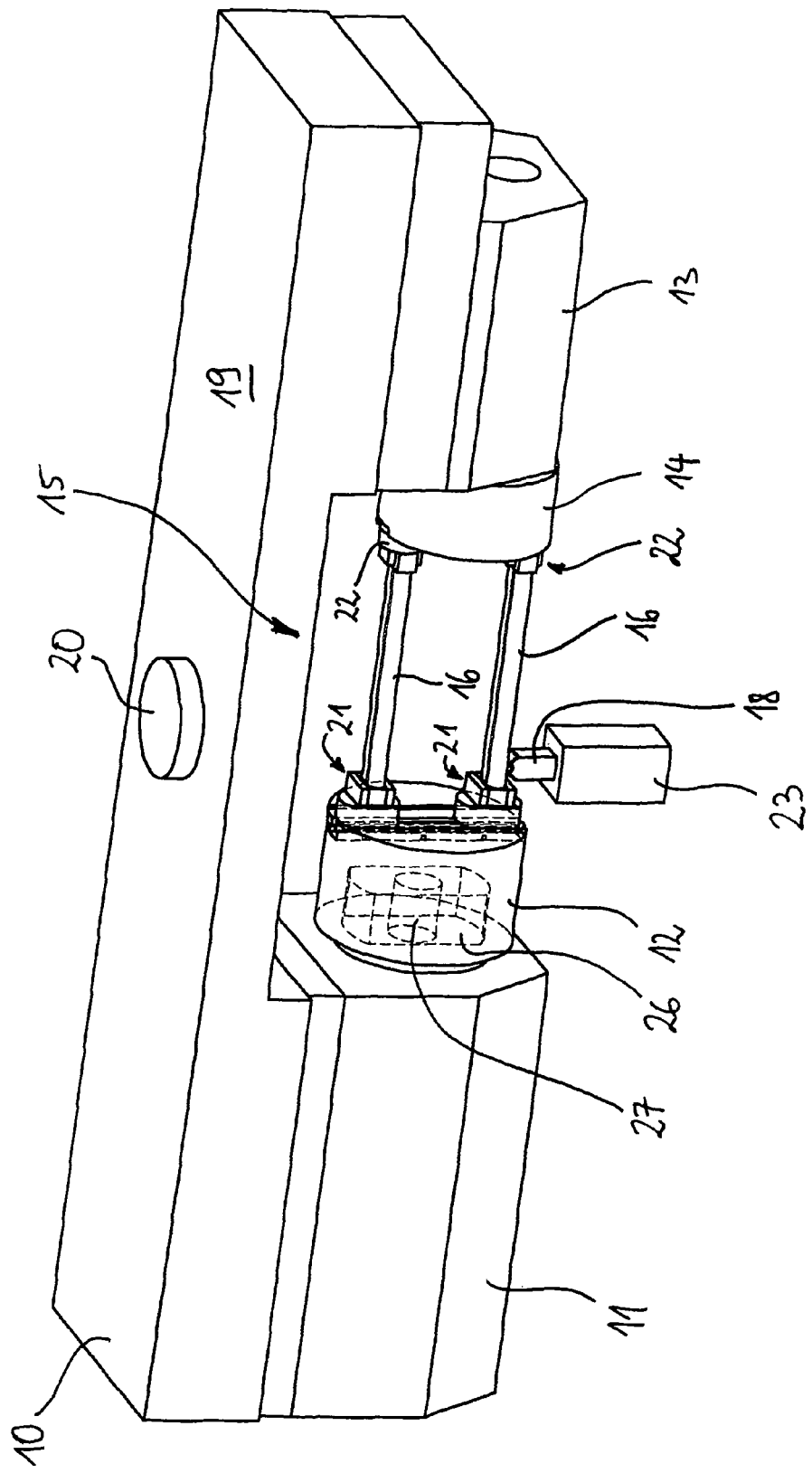
FIG. 3 shows the headstock, tailstock and tool of the lathe according to FIG. 1 in a perspective view from above, with chucked workpieces.
Figure 4:
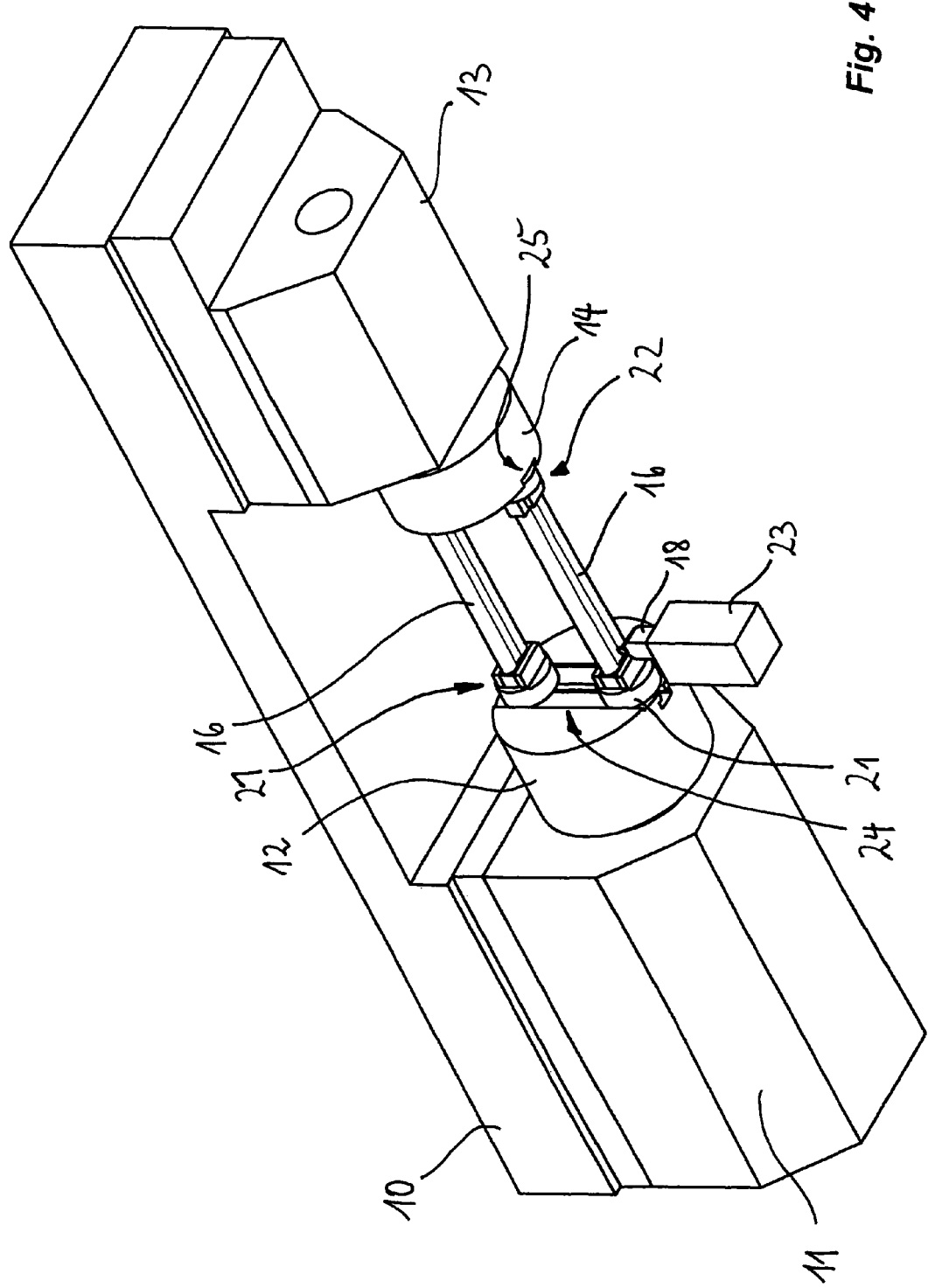
FIG. 4 shows the headstock, tailstock and tool according to FIG. 3 in a perspective view from below.

FIG. 3 shows the built-on slide 10 with the fixture 15 in a view in perspective from above, and FIG. 4 shows the same in a view obliquely from below.

The built-on slide 10 has on its top side 19 an extension 20, at which the suspension of the built-on slide 10 engages on the vertical slide 9 and by which the pivot axis of the built-on slide 10 is defined. The drive provided for this purpose is not shown in any more detail for the sake of greater clarity in the illustration.

In FIG. 3, two workpieces 16 are chucked symmetrically, and free of unbalance, in the fixture 15. For this purpose, the clamping chuck 12 has arranged on it two workpiece receptacles 21, at which the workpieces 16 are in each case chucked with one end. The workpieces 16 are chucked with their other end on corresponding counterholding receptacles 22 which are arranged on the tailstock center sleeve 14.

The tool 18 is arranged on a tool carrier 23 which by means of the tool feed device 17 can be moved radially with respect to the axis of rotation to the clamping chuck 12, the axis of rotation below, and can be fed radially and/or tangentially. When this adjusting movement is executed synchronously with the rotation of the clamping chuck 12 during chip removal on the tool 18, surfaces which do not lie on a cylinder surface area concentric to the axis of rotation can be manufactured by cutting on the workpieces 16. Workpieces 16 which are nonround in virtually any way can thus be manufactured.

The workpiece receptacles 21 and the counterholding receptacles 22 are in each case guided, for example, in grooves 24, 25 and can be adjusted radially between the machining steps, in order to arrange the workpieces nearer to the axis of rotation or further away from this.

In order to compensate unbalances caused, for example, by an asymmetric arrangement of a workpiece 16 or a plurality of workpieces 16, unbalance compensation 27 in the form of a radially displaceable mass is provided on the clamping chuck 12 in a recess 26.

This application uses the terms "radially" and "axially" with respect to the axis of rotation of the rotary spindle and of the clamping chuck 12.

Figure 5:
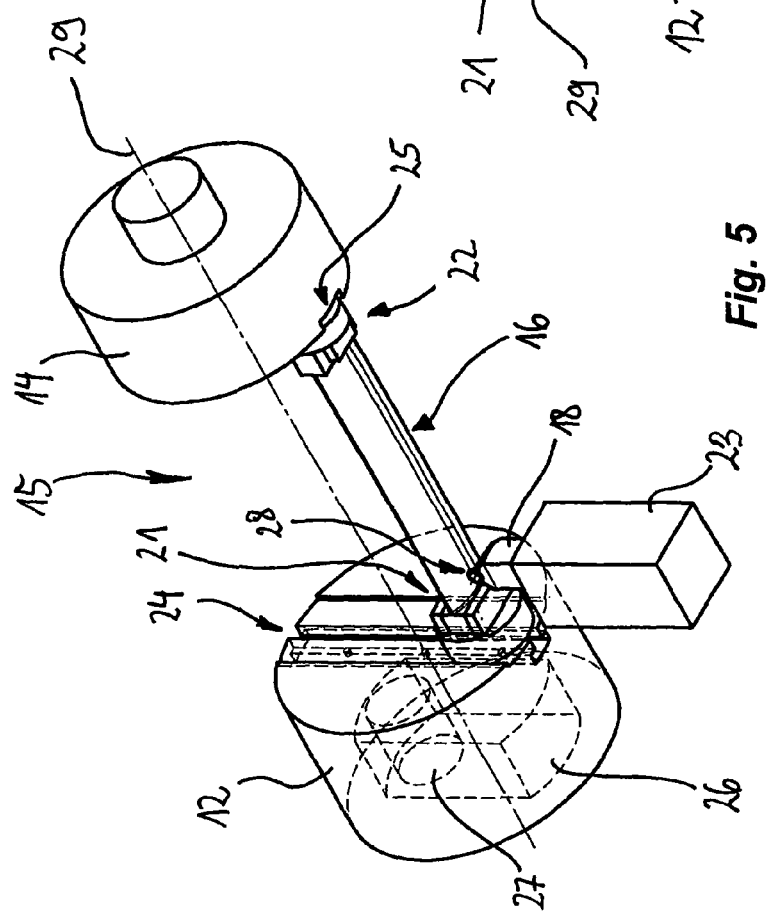
FIG. 5 shows the workpiece receptacle and counterholding receptacle from FIG. 4 with chucked workpiece and turning tool in perspective from above.

FIG. 5 shows a workpiece 16 chucked in the fixture 15 during cutting machining by the cutting edge 28 of the tool 18.

The workpiece 16 has a longitudinal axis which extends between the workpiece receptacle 21 and the counterholding receptacle 22 and which is oriented parallel to the axis of rotation 29. The workpiece 16 is chucked eccentrically at a radial distance from the axis of rotation 29, and therefore the axis of rotation 29 does not run through the workpiece 16. To compensate the unbalance caused thereby, the unbalance compensation 27 is likewise arranged so as to be offset radially with respect to the axis of rotation 29.

The radial position of the tool 18 with respect to the workpiece 16 is then controlled during a revolution of the workpiece 16 about the axis of rotation, such that, after chip removal, the nonround profile illustrated is obtained on the workpiece 16. Airfoil profiles can also be manufactured in this way.

Figure 6:
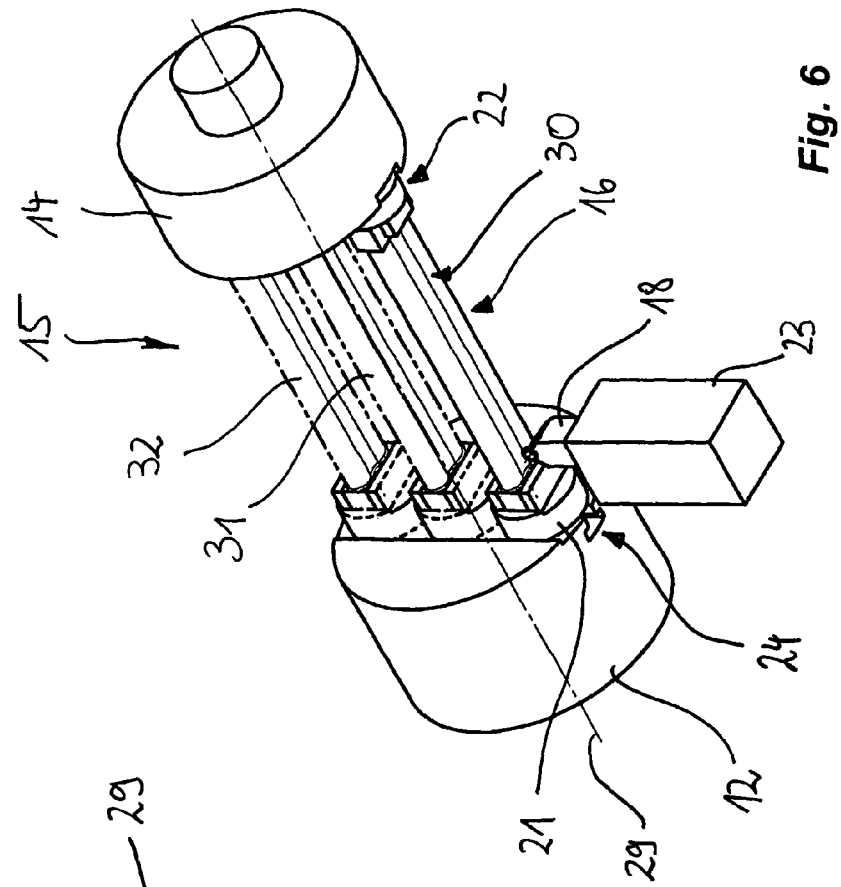
FIG. 6 shows various working positions of the chucked workpiece.

FIG. 6 shows, for example, a further workpiece 16 which can be manufactured by means of the lathe 1. In this workpiece 16, the tool 18 is adjusted radially during cutting machining, in such a way that a surface region 30 which points radially outward in the chucked position shown and which has a contour concave in regions is formed on the workpiece.

For further machining steps, the position of the workpiece 16 in the fixture 15 can be varied in that the workpiece 16 is moved into a second radial position 31 centrally with respect to the axis of rotation 29 or a third radial position 32 on the diametrically opposite side or into an intermediate position. The positions 31, 32 are in this case shown merely by way of example. Any freely definable positions may also be assumed.

FIG. 7 shows a view from the front with two identical workpieces 16 which are chucked in the fixture 15 for lathing.

FIG. 8 shows a sectional view along the sectional plane B-B in FIG. 7. The nonround contour of the profile 33 of the workpieces 16 can be seen clearly.

It is likewise evident that, within a revolution of the workpieces 16 about the axis of rotation 29, in each case different surface regions which do not correspond to one another are machined on the workpieces 16 by the tool 18, even through the profiles 33 of the workpieces 16 are identical to one another.

To machine other surface regions, the position of the workpieces 16 in the fixture 15, that is to say in relation to the rotary spindle with the clamping chuck 12, has to be varied, for example by pivoting the workpiece receptacles 21 and counterholding receptacles 22 about the longitudinal axis of the workpieces 16 and/or by moving the workpieces 16 radially, as described above.

Figure 9:
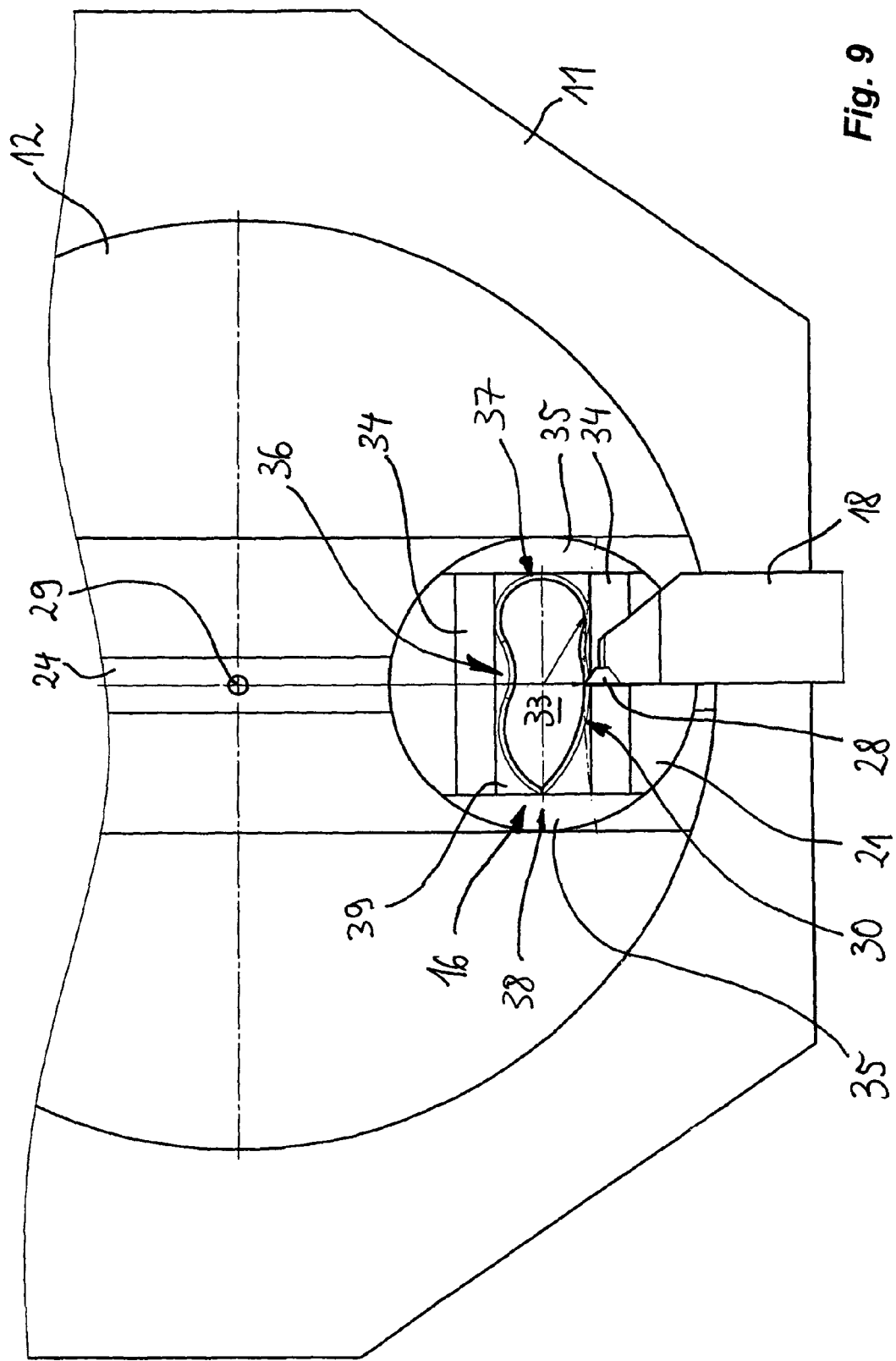
FIG. 9 shows a view of a detail of FIG. 8.

FIG. 9 shows as a detail a view of FIG. 8, the workpiece 16 having been pivoted about its longitudinal axis through an angle in relation to the position in FIG. 8.

The workpiece 16 is chucked on two sides at its end or foot 39 by means of adjustable clamping jaws 34, the clamping jaws 34 being guided linearly in guide elements 35.

The illustrated contour of the surface region 30 on the workpiece 16 can be manufactured in that the radial distance of the tool 18 and, in particular, of the cutting edge 28 from the axis of rotation 29 is correspondingly varied during chip removal on the workpiece 16. For this purpose, a synchronizing device, not illustrated in any more detail, synchronizes the rotation of the workpiece 16 about the axis of rotation 29 with the feed movement of the tool 18.

So that the surface region 36 pointing radially inward in the chucking shown can also be machined by the tool 18, the position of the workpiece 16 in the fixture 15 must be varied, for example by pivoting about the longitudinal axis, perpendicular to the drawing plane of FIG. 8, of the workpiece 16 through an angle of 180° or by moving the workpiece 16 to the position lying diametrically opposite with respect to the axis of rotation 29.

Thus, virtually any, even asymmetric, contours of profiles 33 which are composed of surface regions 30, 36 machined in successive machining steps can be manufactured. In this case, these surface regions 30, 36 may be contiguous to one another in rounded transitional regions 37 or at edges 38.

Figure 10:
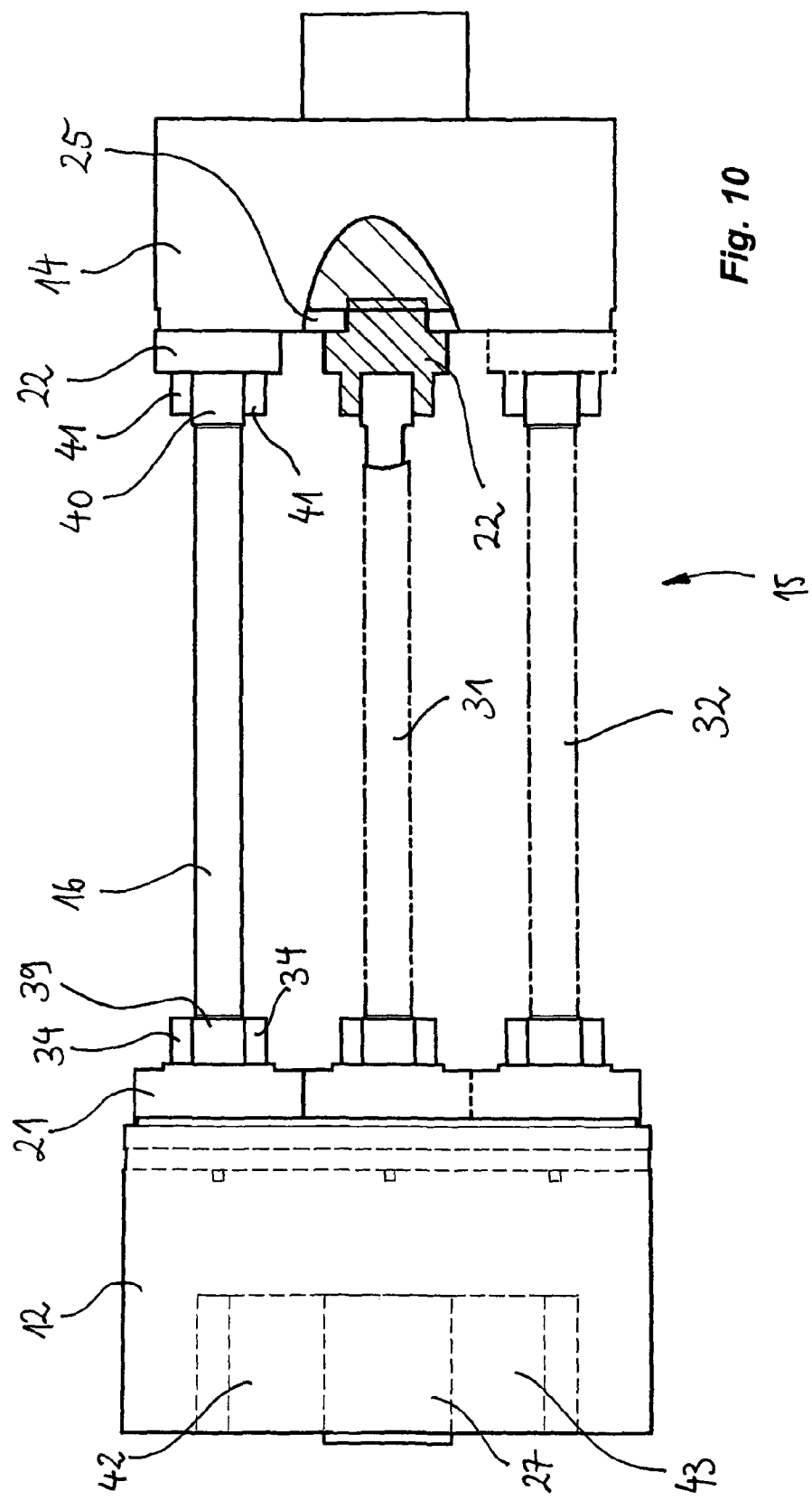
FIG. 10 shows the unbalance compensation in the event of a variation in the position of the chucked workpiece.

FIG. 10 shows the chucked workpiece 16 in the three positions according to FIG. 6 in a view from the front.

The workpiece 16 is in each case chucked with its head 40 in clamping jaws 41 of the counterholding receptacle 22. The clamping jaws 41 are basically designed in the same way as the clamping jaws 34 and are arranged movably.

A partially cutaway illustration shows that the counterholding receptacles 22 are guided in the groove 25 for radial adjustment.

To compensate the unbalance, as described, the unbalance compensation 27 is moved synchronously with the workpiece 16 into position 42, 43 offset eccentrically with respect to the middle position. For this purpose, the lathe 1 has a mechanical and/or electronic synchronizing device, not shown in any more detail.

Figure 11:
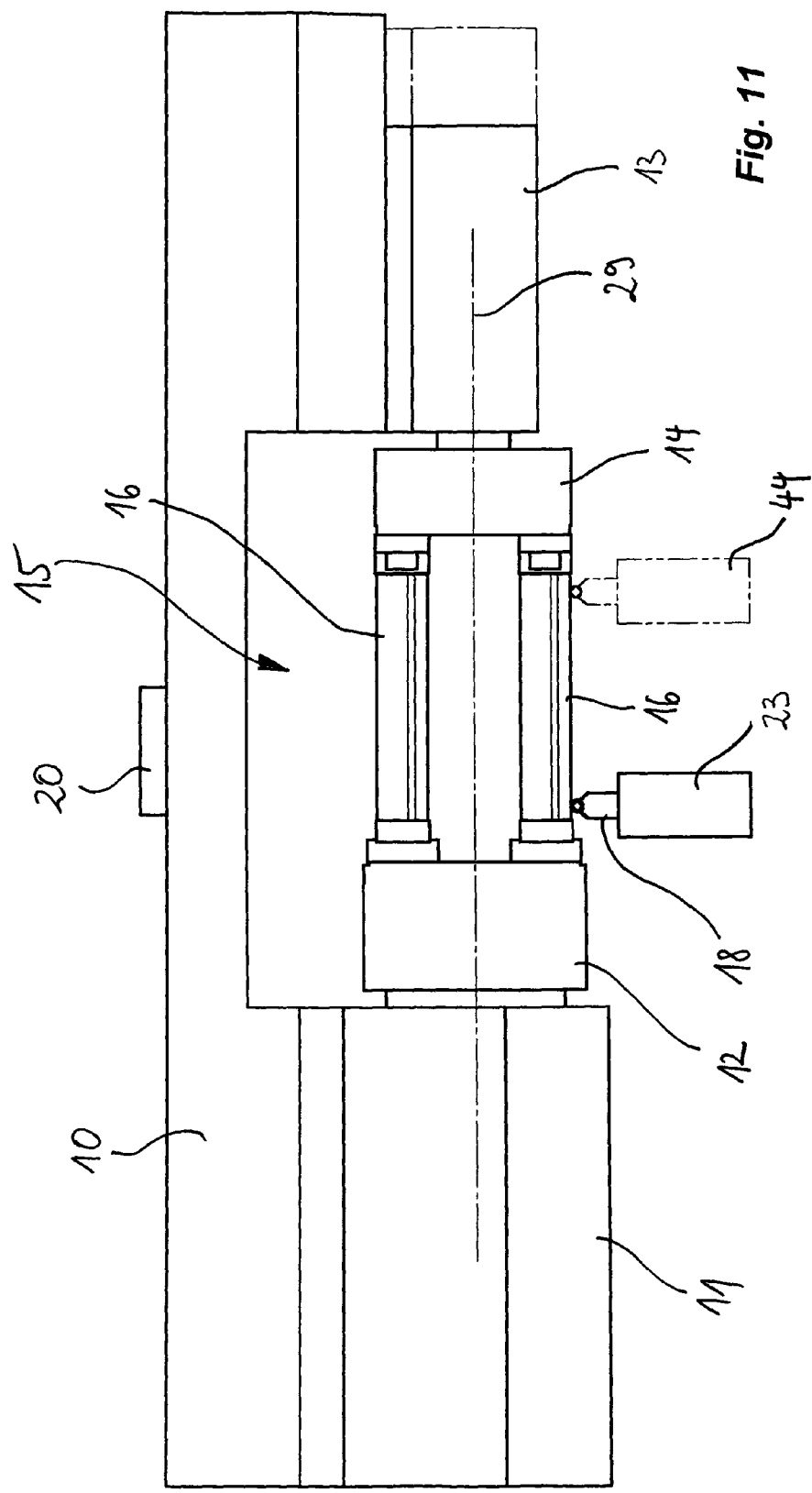
FIG. 11 shows the relative movement of the workpiece and tool with respect to one another along the axis of rotation.

FIG. 11 shows in a view from the front how the workpiece 16 can be moved by means of the workpiece receptacle 21 in relation to the tool 18 longitudinally with respect to the axis of rotation 29 and to the longitudinal axis of the workpiece 16, in order to carry out lathing on further axial portions of the workpiece 16. A changed axial position 44 of the tool carrier 18 with respect to the workpiece 16 is thus obtained. In this case, the tool 18 may remain fixed in space, and there may be provision whereby the manufactured profile 33 of the workpiece 16 changes along its longitudinal axis.

It is evident, furthermore, in FIG. 11 that the tailstock 13 is arranged so as to be movable along the axis of rotation 29 with respect to the built-on slide 10 on the latter, in order to allow different lengths of the workpiece 16.

Figure 12:
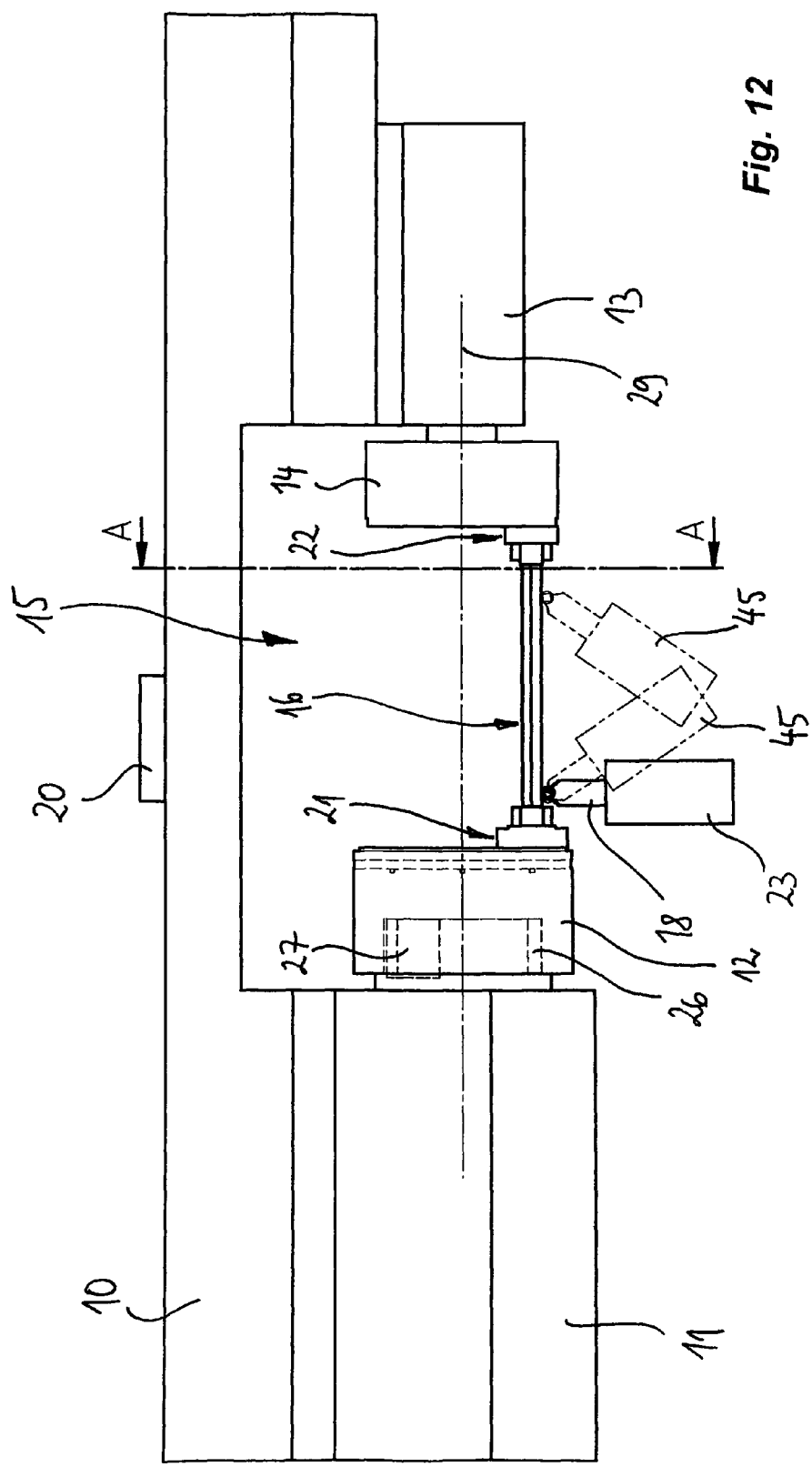
FIG. 12 shows the relative pivoting of the workpiece and tool with respect to one another about an axis perpendicular to the axis of rotation.

FIG. 12 shows that the tool carrier 23 with the tool 18 can be pivoted about a pivot axis which lies in a radial plane and is perpendicular to the drawing plane in FIG. 12 if the profile to be manufactured on the workpiece 16 so requires. This pivoting movement may be executed, for example, by pivoting the built-on slide 10 about its pivot axis. Various positions 45 of the tool carrier 23 are illustrated by way of example, and even intermediate positions can be assumed.

Figure 13:
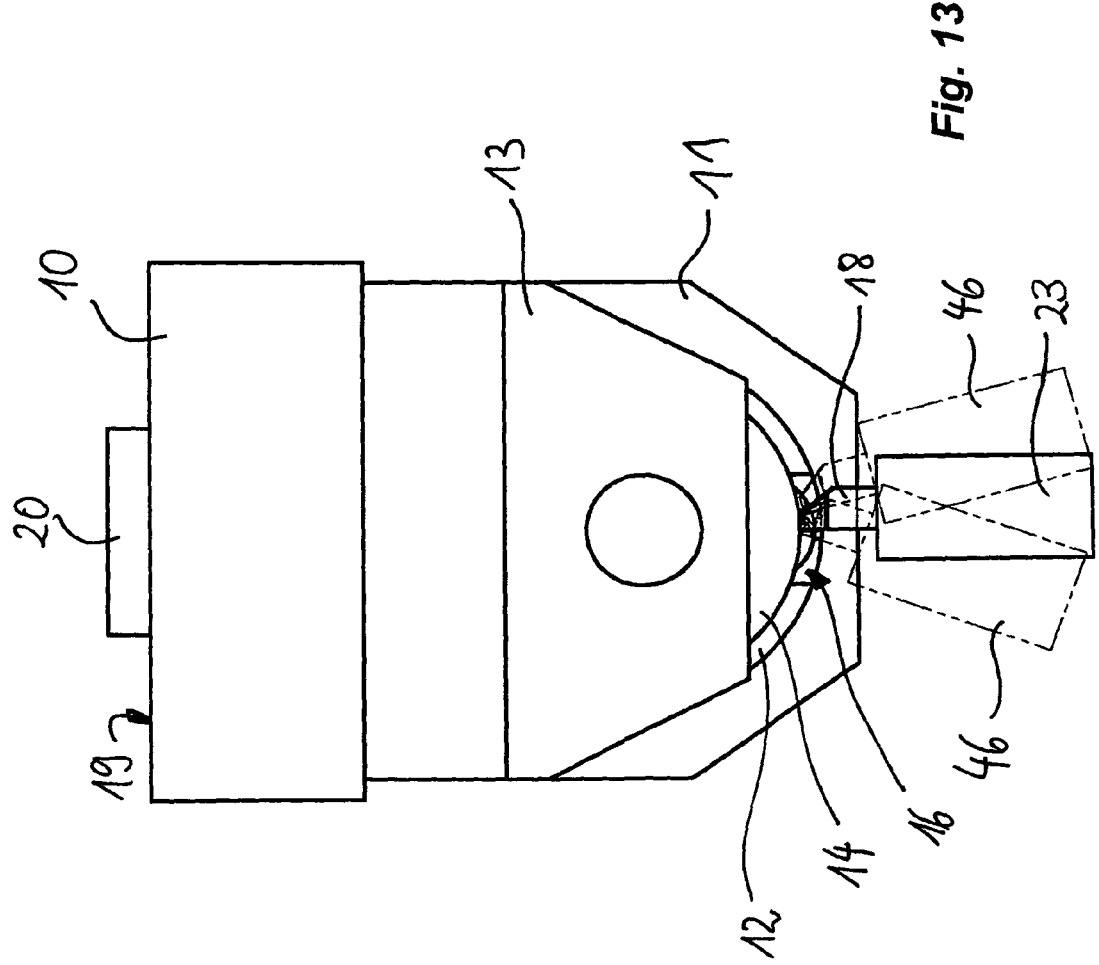
FIG. 13 shows the relative pivoting of the workpiece and tool with respect to one another about an axis parallel to the axis of rotation.

FIG. 13 shows a view from the side of the tailstock 13, in which various working positions 46 of the tool carrier 23 with the tool 18 are shown. These positions 46 merge one into the other as a result of the pivoting of the tool carrier 23 and of the built-on slide 10 with respect to one another about an axis which is oriented parallel to the axis of rotation. Intermediate positions may also be assumed.

FIG. 14 shows a blank 47 of round cross section, from which a workpiece 16 can be manufactured. FIG. 15 shows a blank 48 of rectangular cross section. In the blanks 47, 48, the edges projecting toward the tool 18 are first machined in a roughing operation, in order to achieve an approximation to the desired final shape of the workpiece 16.

FIGS. 16 and 17 show by way of example two possible workpieces 16 which can be manufactured by means of the method according to the invention on the lathe according to the invention. In this case, the workpiece 16 may have a thickening 50 of its profile along its longitudinal direction. Turbine blades are illustrated diagrammatically by way of example.

FIGS. 18 and 19 show by way of example turning tools 18 with different cutting edges 28 for manufacturing different contours of the profile 33 of the workpiece 16.

FIG. 20 shows a tool 18 with a milling cutter 49, by means of which, for example, the planar surfaces of the thickening 50 can be manufactured.

Figure 21:
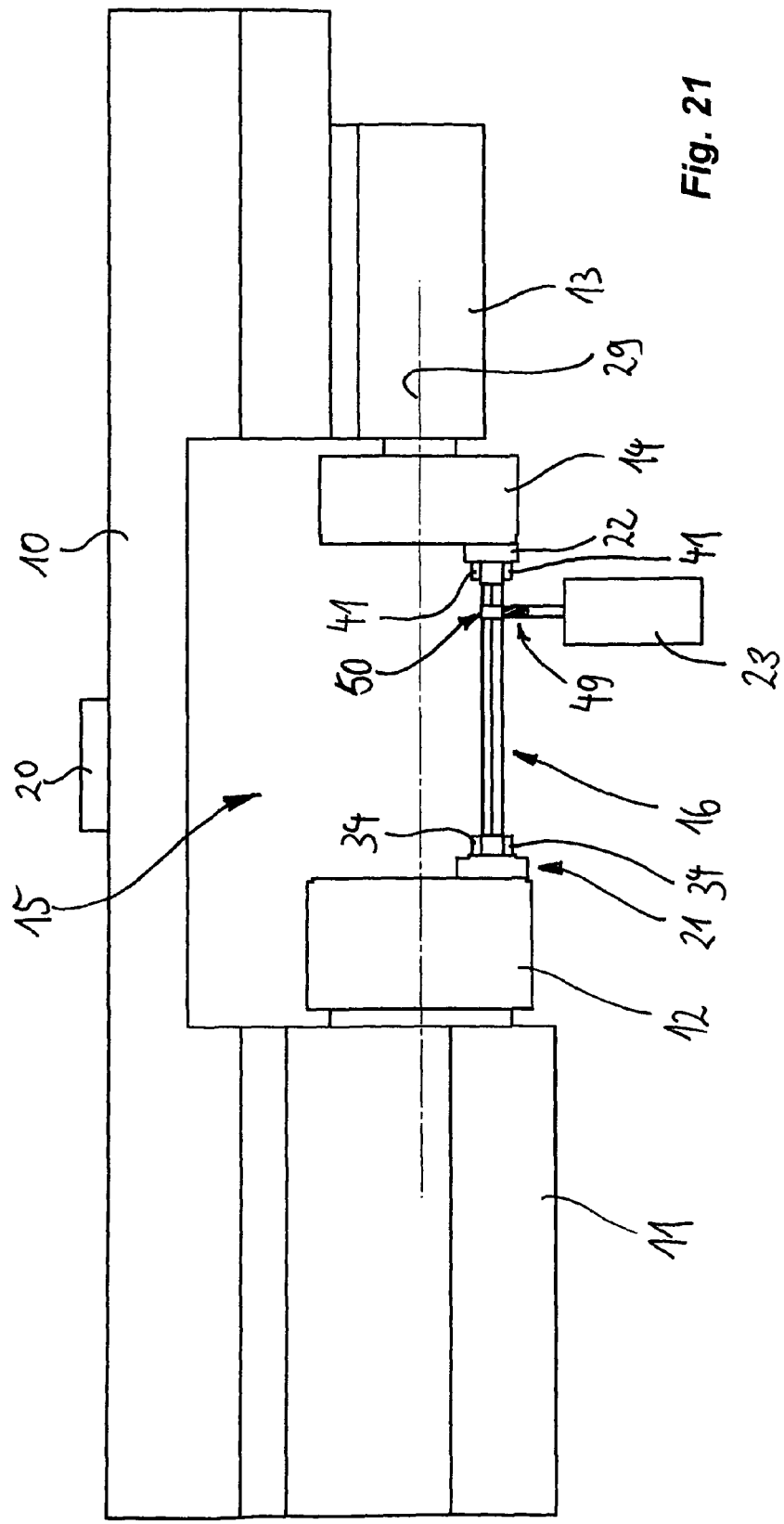
FIG. 21 shows the machining according to the invention of a cross-sectional thickening in a view from the front.
Figure 22:
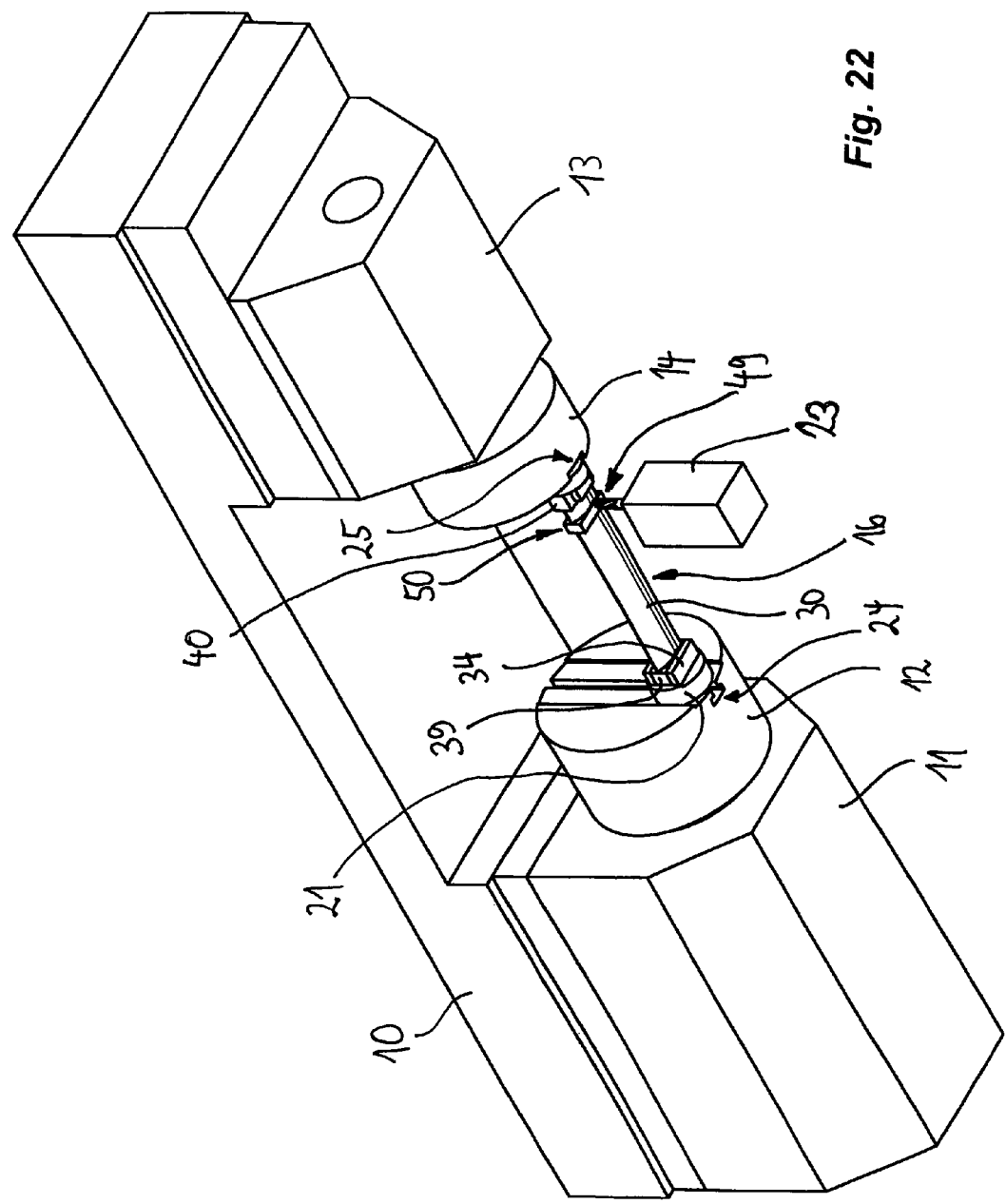
FIG. 22 shows the machining according to the invention, as shown in FIG. 21, in a perspective view from below.

FIG. 21 and FIG. 22 show this manufacture which may follow or precede the lathing described above.

With regard to the lathe 1, it is provided that the workpiece 16 intended for lathing by means of a tool 18 is chucked with its longitudinal axis parallel to the axis of rotation 29 of the rotating fixture 15, in such a way that the axis of rotation 29 does not intersect the workpiece 16, and in such a way that the position of the workpiece 16 in the fixture 15 is varied between two machining steps of lathing in such a way that hitherto unmachined surface regions 30, 36 are brought into the working range of the tool 18.

The invention claimed is:

1. A method for machining by lathing at least two elongate workpieces (16) having a longitudinal axis, comprising: chucking said at least two workpieces (16) in a rotating fixture (15) and rotating the at least two workpieces at a machining speed about an axis of rotation (29), feeding a turning tool (18) which performs the lathing transversely with respect to the axis of rotation (29), with a cutting speed of lathing resulting from the rotation of the workpieces (16) in relation to the turning tool (18), the workpieces (16) are chucked with their longitudinal axes parallel to the axis of rotation (29), but eccentrically and at a radial distance from the axis of rotation (29), in the fixture (15), with the axis of rotation (29) not passing through the workpieces (16), and the turning tool (18) is fed radially from outside transversely with respect to the axis of rotation (29), the workpieces (16) orbiting about the axis of rotation (29) on an imaginary cylinder for forming a non-round profile, and an orbiting speed corresponds to the rotational speed of the workpieces, and, during an orbiting movement about the central axis of rotation (29), the workpieces execute a revolution, and always a same respective outer face of the respective workpieces (16) points radially outward during lathing, while the workpieces (16) are then held immovable in relation to the fixture (15), wherein the at least two workpieces (16) are lathed in a common operation.

2. The method as claimed in claim 1, further comprising during a revolution of the workpieces (16), moving the turning tool (18) to different radial distances from the axis of rotation (29).

3. The method as claimed in claim 1, further comprising synchronously executing a feed movement of the turning tool (18) with the rotation of the workpieces (16).

4. The method as claimed in claim 1, further comprising additionally moving the turning tool (18) and the workpieces (16), during lathing, parallel to the axis of rotation (29) in relation to one another.

5. The method as claimed in claim 1, further comprising after the lathing of the radially outward-pointing surface regions (30), varying a position of the workpieces (16) in the fixture (15) such that hitherto radially inward-pointing surface regions (36) point outward, and the then outward-pointing surface regions (36) are lathed.

6. The method as claimed in claim 1, further comprising to vary a position of the workpieces, moving the workpieces (16) in the fixture (15) along a path lying in a radial plane, at least one of along a path running through the axis of rotation (29), or onto a side lying opposite with respect to the axis of rotation (29).

7. The method as claimed in claim 1, further comprising to vary a position of the workpieces, moving the workpieces (16) between a position spaced apart radially from the axis of rotation (29) and a position which is central with respect to the axis of rotation (29).

8. The method as claimed in claim 1, further comprising to vary a position of the workpieces, rotating the workpieces (16) in the fixture (15) through an angle of rotation about the longitudinal axis.

9. The method as claimed in claim 1, further comprising pivoting the turning tool (18), during lathing, with a feed direction in at least one of a radial plane or in a plane including the axis of rotation (29).

10. The method as claimed in claim 1, wherein at least two turning tools (18) are used, which engage on the workpiece (16) during lathing.

11. The method as claimed in claim 1, wherein a nonround workpiece (16) having a cross section which is flat transversely to the longitudinal axis, is manufactured.

12. The method as claimed in claim 1, wherein a blank (47, 48) with at least one of a free shape, a rectangular, round or elliptic initial cross section, is lathed transversely to the longitudinal axis.

13. The method as claimed in claim 1, wherein for lathing, first roughing and then smoothing are carried out.

14. The method as claimed in claim 13, wherein during roughing, a change in a direction of rotation is carried out.

15. The method as claimed in claim 13, wherein during roughing, a radial distance of the tool (18) from the axis of rotation (29) of the fixture (15) remains unchanged over a revolution.

16. The method as claimed in claim 13, wherein during roughing, the workpiece (16) is given a shape which lies near to a finished contour.

17. The method as claimed in claim 1, wherein the rotation of the workpiece (16) is executed at at least 5 rev/min.

18. The method as claimed in claim 1, further comprising in a single chucking of the at least two workpieces, in the case of a first one of the workpieces (16), on the one hand, and a second one of the workpieces (16), on the other hand, machining different surface regions (30, 36, 37), with differently curved contours running transversely to the respective longitudinal axes.

19. A lathe (1) for non-round profiles, comprising a fixture (15) driven by a rotary spindle and a tool carrier (23) capable of being fed transversely to an axis of rotation (29) of the rotary spindle and having a turning tool (18), the fixture (15) has an arrangement of at least two workpiece receptacles each being arranged arranged eccentrically at a radial distance from the axis of rotation (29) of the rotary spindle in a rotationally symmetrical position with respect to one another, and a synchronizing device is provided, which synchronizes a feed movement of the tool carrier (23) with the rotation of the rotary spindle.

20. The lathe (1) as claimed in claim 19, wherein the fixture (15) has a tailstock center sleeve (14) rotatable about the axis of rotation (29) of the rotary spindle and having a counter-holding receptacle (22) for an end (40) of the workpiece (16) which faces away from the rotary spindle.

21. The lathe (1) as claimed in claim 19, the fixture (15) has an unbalance compensation arrangement (27) for a chucked workpiece (16).

22. The lathe (1) as claimed in claim 21, wherein the unbalance compensation arrangement (27) and the workpiece receptacle (21) are arranged so as to be movable synchronously.

23. A lathe (1) for non-round profiles, comprising a fixture (15) driven by a rotary spindle and a tool carrier (23) capable of being fed transversely to an axis of rotation (29) of the rotary spindle and having a turning tool (18), the fixture (15) has a workpiece receptacle (21) arranged eccentrically at a radial distance from the axis of rotation (29) of the rotary spindle, and a synchronizing device is provided, which synchronizes a feed movement of the tool carrier (23) with the rotation of the rotary spindle, the fixture (15) has an unbalance compensation arrangement (27) for a chucked workpiece (16), and the unbalance compensation arrangement (27) is formed by a further chucked workpiece (16).

24. The lathe (1) as claimed in claim 20, wherein at least one of the workpiece receptacles (21) or the counterholding receptacle (22) is arranged at least one of rotatably about an axis oriented parallel to the axis of rotation (29) of the rotary spindle, movably transversely to the axis of rotation (29) so as to intersect the axis of rotation (29), or movably transversely to the axis of rotation (29) onto a side lying opposite with respect to the axis of rotation (29).

25. The lathe (1) as claimed in claim 20, wherein the tailstock center sleeve (14) can be driven by a rotary drive.

26. The lathe (1) as claimed in claim 25, wherein a further synchronizing device is provided, by which the rotation of the rotary spindle can be synchronized with a rotation of the tailstock center sleeve (14).

27. The lathe (1) as claimed in claim 19, further comprising a machining unit for rough machining.

28. The lathe (1) as claimed in claim 19, wherein the tool carrier (23) is arranged pivotably about an axis oriented askew to the axis of rotation (29) of the rotary spindle.

29. The lathe (1) as claimed in claim 19, wherein the tool carrier (23) and the workpiece receptacle (21) are additionally arranged so as to be movable with respect to one another parallel to the axis of rotation (29) of the rotary spindle.

* * * * *